Sept. 30, 1969  P. L. RICHMAN  3,470,445
R.M.S. TO D.C. CONVERTER FOR PERIODIC SIGNALS
Filed Jan. 3, 1968  3 Sheets-Sheet 1

INVENTOR.
Peter L. Richman
BY
ATTORNEY

United States Patent Office 3,470,445
Patented Sept. 30, 1969

3,470,445
R.M.S. TO D.C. CONVERTER FOR PERIODIC SIGNALS
Peter L. Richman, Lexington, Mass., assignor to Weston Instruments, Inc., Newark, N.J., a corporation of Delaware
Filed Jan. 3, 1968, Ser. No. 695,375
Int. Cl. H02m 1/08, 7/44
U.S. Cl. 321—1.5                                                6 Claims

ABSTRACT OF THE DISCLOSURE

A system for converting the R.M.S. value of a periodic electrical input waveform into a substantially D.C. output waveform of proportional magnitude, the periodic waveform crossing a known axis in a given direction only once during each period thereof. The conversion is effected by a thermal converter having its input periodically switched to receive the periodic waveform. Each axis crossing of the periodic waveform is detected and two out of a plurality of axis crossings are utilized to synchronize the selective connection of the thermal converter input to that waveform and to a correspondingly synchronized D.C. feedback signal. The D.C. feedback signal is received by the converter input via a feedback loop and has a magnitude proportional to the R.M.S. value of the periodic waveform from whence it is derived. The feedback loop tends to nullify magnitude differentials between the feedback signal and the R.M.S. value of the periodic waveform so that time-varying transients produced by the successive connection of the converter input to the periodic waveform and to the feedback signal are caused to assume similar waveshapes thereby substantially lessening the problem of compensating for such transients.

---

Figure 1:
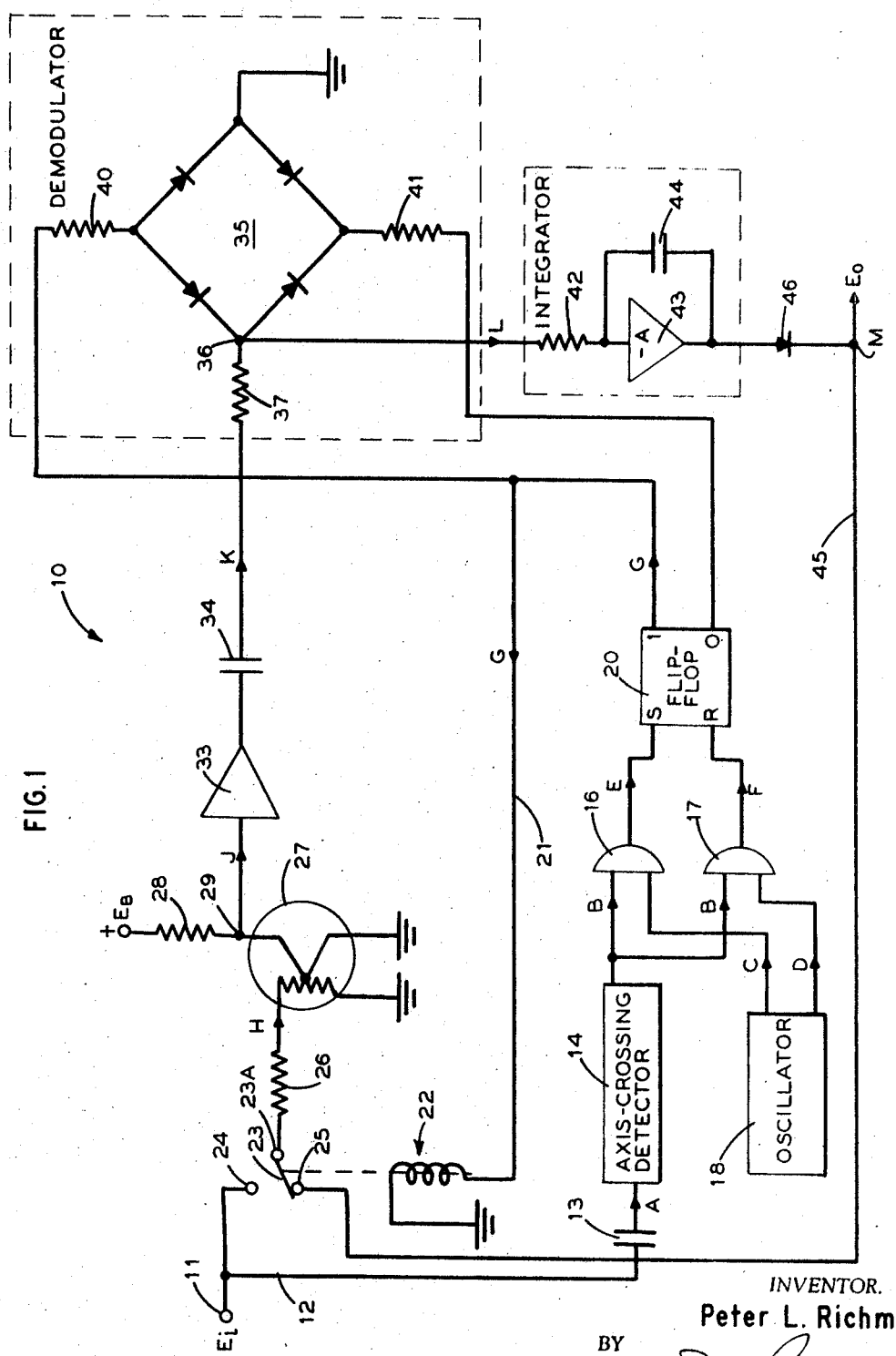

Known prior art systems which are used to convert the root mean square (R.M.S.) value of a time-varying signal into a D.C. output signal having a magnitude that is substantially proportional to the R.M.S. value of the time-varying signal often utilize a thermal converter for effecting the desired conversion. The thermal converter typically embodies a resistance element or heater and in some applications an input switching device, the latter device being typically employed to effect the successive connection of the heater to receive the time-varying input signal and a standard or reference D.C. signal of controllably variable magnitudes against which the value of time-varying signal is, for instance, to be compared. The heat produced by the thermal converter heater is equal to the product of the resistance value of the heater and the squared value of the current flowing therethrough. The magnitude of the essentially D.C. potential produced by the thermal converter is proportional to the amount of heat generated by the heater and hence, is approximately proportional to the mean square value of the time-varying input signal waveform.

As a result of switching from one input signal to the other, the thermal converter typically generates a small transient potential which appears as a time-varying signal superimposed on the D.C. output potential of the thermal converter. This transient is a physical manifestation of a thermal transition which takes place in the thermal converter at the instant of switching the heater to receive one of the input signals regardless of the relative instantaneous values of the input signals. Of particular significance is the case of the two input signals having equal R.M.S. values, but not necessarily equal instantaneous values. In such case, it can be expected that as these two input signals are successively transferred to the heater of the thermal converter, the waveforms of the succession of transient potentials produced at the output of the thermal converter will have waveshapes, that is, component magnitudes and time durations, which are completely arbitrary. Moreover, the phase relationships between successive transients may also be arbitrary. It is extremely difficult, if not impossible as a practical matter, to provide appropriate compensation for, or the removal of, transient potentials of arbitrary waveshapes by resorting to known techniques and expedients including, for example, waveform clipping and/or filtering.

It is an object of this invention to provide a system for converting periodic electrical input waveforms which are successively applied to the system into proportional D.C. output waveforms, wherein repetitive transients in the output waveforms produced by the successive applications of the input waveforms to the system are caused to assume similar waveshapes.

Another object of this invention is to provide an R.M.S. to D.C. converter for periodic input electrical waveforms that cross a known potential level only once in a given direction during each period thereof, wherein transients in the D.C. output resulting from the initial applications to the converter of the input waveforms are forced to assume substantially identical waveshapes, thereby significantly reducing the problem of compensating therefor.

For a better understanding of the present invention, together with other and further objects thereof, reference may be had to the following description taken in connection with the accompanying drawings, the scope of the invention being pointed out in the appended claims.

Figure 2:
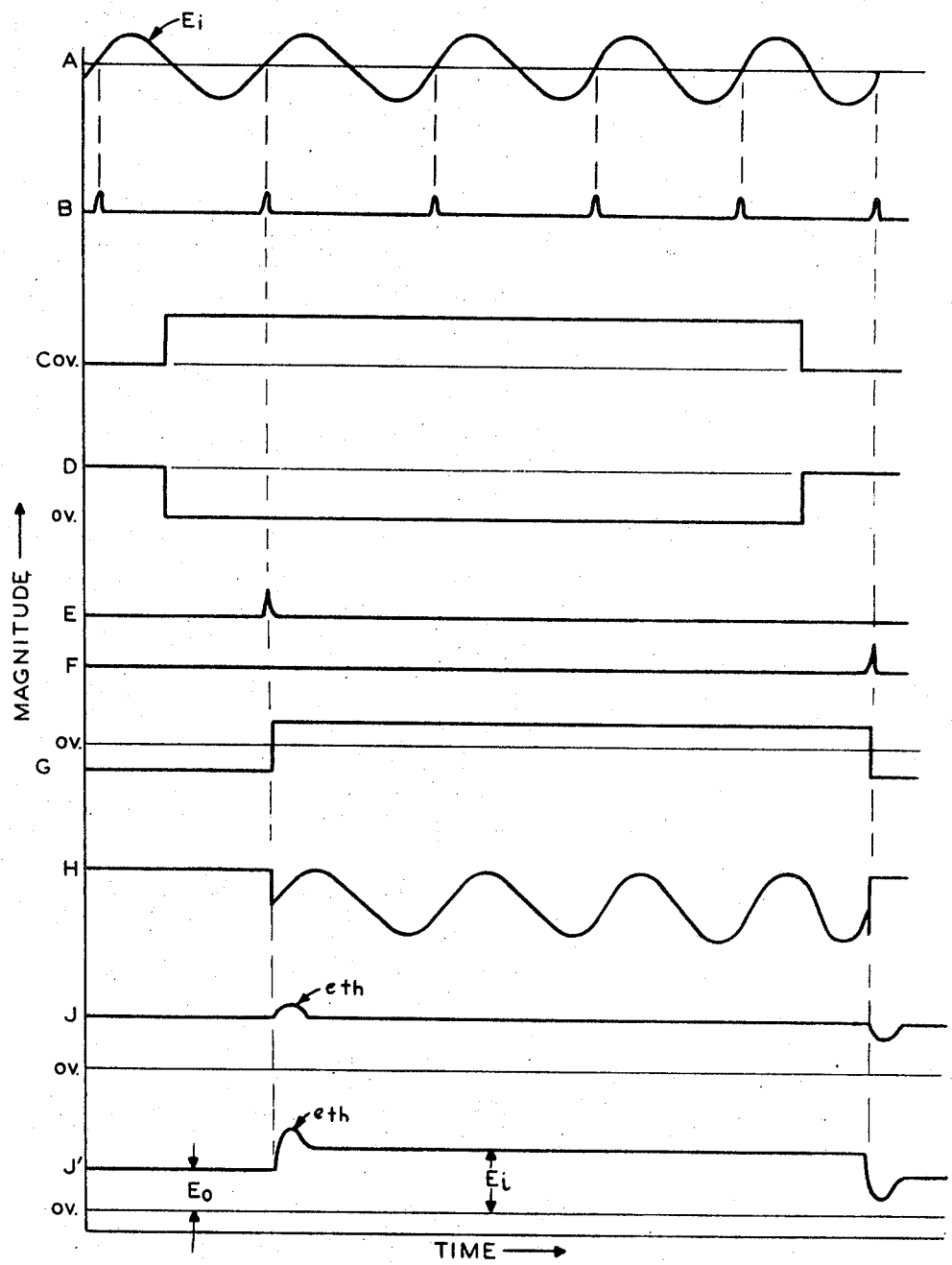
Figure 3:
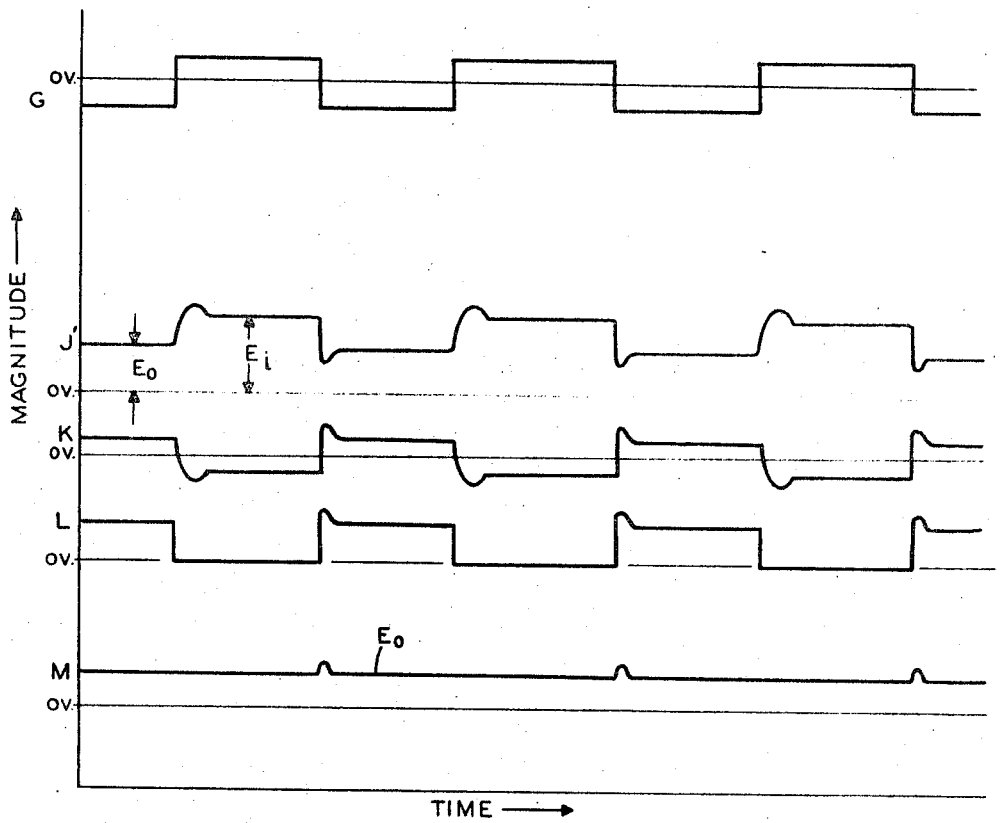

Referring to the drawings:

FIGURE 1 illustrates partially in block and partially in schematic form a circuit diagram of one embodiment of a system constructed in accordance with the principles of this invention;

FIGURES 2A–2J, inclusive, illustrate typical electrical waveforms which may appear at correspondingly lettered points in the diagram of FIGURE 1;

FIGURE 2J′ illustrates a nonsteady state waveform which may appear at the point J in FIGURE 1;

FIGURES 3G and 3J′ illustrate on a reduced time scale the waveforms depicted by FIGURES 2G and 2J′, respectively; and FIGURES 3K–3M, inclusive, illustrate three additional waveforms which appear at correspondingly lettered locations in the diagram of FIGURE 1, the first two waveforms depicting typical nonsteady state waveforms, and the last waveform depicting the system output signal under steady state conditions.

Referring now to FIGURE 1, there is shown a system 10 for converting a time-varying electrical input signal $E_i$ into an output voltage $E_o$ having a magnitude proportional to the R.M.S. value of the signal $E_i$. Preferably, the input signal $E_i$ has a waveform which crosses an axis of some known or ascertainable potential level, typically ground potential, only once in a given direction in going from one potential level to another during each complete cycle or period of the waveform. The axis crossing by the waveform may be in either a positive-going or a negative-going direction relative to the assumed axis potential level. As will be apparent, many common types of waveforms have such characteristics; typical examples including sawtooth, square and sinusoidal waveforms. The latter type of waveform may be distorted by the inclusion of substantial amounts of harmonic components.

The input signal $E_i$ is applied to a circuit input terminal 11 and conducted via a lead 12 to an A.C. coupling capacitor 13 connected to the input of an axis-crossing detector 14. The capacitor 13 serves to block any D.C. components which may be present in the input signal from being received by the detector 14. The detector 14 is of a conventional type which detects each positive-going crossing by the signal $E_i$ of a pre-established potential level of, for example, zero volts, and produces a positive pulse in response to each detected axis crossing. As exemplary of one embodiment of this invention, the axis-crossing detector 14 is disclosed as a positive-going axis-crossing detector but it will be apparent that by appropriate modification of the hereinafter described circuitry a negative-axis-crossing detector may be used as an alternative. As illustrative of the operation of the detector 14, FIGURE 2A depicts an input signal $E_i$ having a waveform of generally sinusoidal configuration and a zero-volt axis of symmetry. FIGURE 2B depicts the output pulses which are produced by the detector 14 in response to each positive-going zero-volt axis crossing of the signal $E_i$.

The output signals which are produced by the detector 14, FIGURE 1, are received as input signals by a pair of dual-input AND gates 16 and 17. One input terminal of each gate 16 and 17 is connected to the output of the detector 14 and the other input terminal of each gate is connected by a conductor C and D, respectively, to a different one of two output terminals of an oscillator 18.

The oscillator 18 may comprise a free-running multivibrator which, when placed into oscillation, produces at each of its two output terminals a square wave voltage, one of such voltages being 180 degrees out-of-phase with respect to the other. FIGURE 2C illustrates a typical square wave voltage on the oscillator output conductor C, FIGURE 1, whereas FIGURE 2D illustrates a typical square wave voltage on the other oscillator output conductor D, FIGURE 1. The oscillator 18 typically has a pulse repetition frequency which is substantially lower than the frequency of the input signal $E_i$ so that each positive step potential of the oscillator square wave output remains at the more positive potential level for a number of successive axis crossings of the signal $E_i$. A number of successive cycles of the signal $E_i$ are permitted to pass during each half period of the square wave output to allow sufficient time for the thermal converter to attain a steady state condition of thermal equilibrium at a power level which corresponds to the mean square value of the signal $E_i$.

The gates 16 and 17 alternately receive the positive potential pulses from the oscillator 18 and are thus alternately conditioned or partially enabled once during every half period of oscillator operation. The output of the gate 16 is connected to a "set" terminal, designated S in FIGURE 1, of an R-S type of flip-flop 20 and the output of the gate 17 is connected to a "reset" terminal, designated R, of this flip-flop. During each half period when the oscillator 18 produces the positive output pulse depicted in FIGURE 2C, the gate 16 will be enabled to pass the next positive output pulse, FIGURE 2B, which is received from the detector 14 after the positive-going leading edge of the corresponding oscillator enabling pulse is received by that gate.

The positive pulse passed by the fully enabled gate 16 is depicted by FIGURE 2E, and is applied to terminal S of the flip-flop 20 to drive the flip-flop from its reset state into its set state. With the flip-flop 20 initially in its reset state, the potential at flip-flop output terminal 1 will be at some negative level with respect to ground and, conversely, the potential at the flip-flop output terminal 0 will be positive with respect to ground, the magnitude of this positive voltage being great enough to drive the circuitry connected to the terminal 0. When the flip-flop is driven into its set state, the relative polarities of the flip-flop output potentials reverse; the potential at the output terminal 1 rising sharply to a positive potential level relative to ground, this level also being high enough to provide sufficient driving voltages to the circuitry connected to the terminal 1. Coincidentally and conversely, the potential at output terminal 0 drops sharply to a level which is negative with respect to ground potential, that is, to practically the same potential level of the terminal 1 with the flip-flop in its reset state. To prevent the false triggering of the flip-flop 20 back to the reset state during this half period, when the oscillator 18 is providing via the conductor C the positive step potential of FIGURE 2C to the gate 16, a disabling voltage, FIGURE 2D, is applied to the gate 17 via the conductor D, so that the latter gate blocks the transmission of detector output pulses to the reset terminal R of the flip-flop. The flip-flop is reset during the next half period of oscillator operation by a positive step potential, FIGURE 2D, applied to condition the gate 17 to pass the next pulse that is produced by the detector 14 after the leading edge of that positive step potential is received by that gate. This pulse, FIGURE 2F, is passed by the gate 17 and applied to the reset terminal R to trigger the flip-flop 20 from its set state into its reset state.

Referring to FIGURE 2G, it will be seen that the flip-flop 20 produces an output at flip-flop terminal 1 which rises sharply from a negative potential level to a positive potential level at a time which is practically coincidental with the first axis crossing of the input signal $E_i$ that follows the application of the enabling potential to the gate 16. Thus, the triggering of the flip-flop 20 into the set state is synchronized to an axis crossing of the input signal $E_i$ and since there is no appreciable time delay between the axis crossing that causes triggering of the flip-flop and the production of a corresponding square wave at its output terminal, the leading edge of each square wave flip-flop output is produced at virtually the same instant as its corresponding axis crossing. The trailing edge of the positive pulse on the flip-flop terminal 1 is formed when the flip-flop 20 is driven into the reset state by a triggering pulse from the gate 17, this pulse being produced coincidentally with the next detected axis crossing of the signal $E_i$ following the production of the next positive pulse, FIGURE 2D, by the oscillator 18. The potential at the flip-flop terminal 1 remains at this more positive potential level until a number of subsequent axis crossings have occurred, this number being determined by the pulse repetition frequency of the oscillator 18 and the frequency of the input signal $E_i$.

Accordingly, with the oscillator 18 operating continuously, the flip-flop 20 will be alternately driven to produce a square wave output on flip-flop terminals 0 and 1, each square wave output being 180 degrees out-of-phase with respect to the other and having respective leading and trailing edges. The leading and trailing edges of both square wave outputs coincide with a corresponding axis crossing of the signal $E_i$.

The succession of square waves from the flip-flop output terminal 1 are applied via a conductor 21 to a voltage operated relay 22 which is shown in a de-energized state. Connected to the relay armature is a switch 23 for selectively connecting a switch pivot terminal 23A to a different one of input terminals 24 and 25. The terminal 23A also comprises a thermal converter input terminal When the relay 22 is in a de-energized state the input connection effected by the switch 23 is, as shown, between terminals 25 and 23A, whereas when the relay is energized the relay armature pulls in causing the switch 23 to effect an input connection between terminals 24 and 23A.

The relay 22 is periodically energized by, and for the time duration of, each alternate positive potential that forms the square wave output, FIGURE 2G, and is periodically de-energized by, and for the time duration of, every other negative potential level of that output. With each positive-going leading edge of the square wave output from the flip-flop terminal 1 synchronized to an axis crossing of the time-varying input signal $E_i$, it will be apparent that each initial energization of the relay 22 is similarly synchronized to a corresponding, coincidental axis crossing by the signal $E_i$. Therefore, each initial connection that is effected between the terminals 23A and 24 occurs coincidentally with an axis crossing of the input signal $E_i$ and each subsequent disconnection is effected coincidentally with a subsequent axis crossing of the signal $E_i$. It will be understood that the relay 22 and the switch 23 are merely exemplary of one conventional type of voltage-controlled switching device. Two bipolar gates, each having one input terminal connected to the conductor 21 and another input terminal connected to a different one of the terminals 24 and 25 might also be used to effect the synchronized connection and disconnection of the thermal converter input terminal 23A to and from each of the terminals 24 and 25.

The thermal converter input terminal 23A is connected to a current-limiting resistor 26 of an indirectly-heated thermistor 27. The resistance of the thermistor heater is compared with that of a fixed resistor 28 of know resistance value connected at the upper end thereof to a source of known, positive D.C. potential $E_B$. The lower end of the resistor 28 is joined to a thermal converter output terminal 29. The illustrated thermistor is exemplary of one conventional type of thermal converter and, alternatively, the thermal converter could take the form of a thermocouple having its heater connected directly to the terminal 23A. For reasons well known to those working in this art, the magnitude of the approximately square wave potential which appears at the converter output terminal 29 is directly proportional to the difference between the mean square values of the two input signals which are alternately applied to the converter input terminal 23A. Output potentials from the thermal converter 27 are received by an A.C. amplifier 33 which is operated as a Class A amplifier, that is, throughout the linear portion of its voltage-current transfer characteristic curve. Thus, the output potential waveform of the amplifier 33 follows essentially as an amplified replica of the thermal converter output potential waveform, has the same polarity if the amplifier gain is positive, but is of opposite polarity if the amplifier gain is negative.

The signal output of the amplifier 33 is A.C. coupled through A.C. coupling capacitor 34 to a demodulator and is thereby sampled in synchronism with the alternate switching of the thermal converter input by the synchronizing pulses produced by the flip-flop 20. A train of synchronizing pulses from the flip-flop 20 forms a square wave that may be analogized to a low frequency carrier wave and thus the synchronizing pulses may be amplitude demodulated to eliminate the presence of the carrier wave. The demodulator may comprise any one of several conventional demodulators and is illustrated as comprising a four-diode bridge 35 having a terminal 36 connected to receive the output potential of the amplifier 33 through a voltage-dropping resistor 37. The bridge terminal opposite the terminal 36 is connected to ground potential and the bridge terminals adjacent terminal 36 are coupled through respective voltage-dropping resistors 40 and 41 to respective output terminals 1 and 0 of the flip-flop 20.

The output potential of the amplifier 33 is demodulated in synchronism with the operation of the relay 22 and the switch 23; the amplitude-demodulated signal in the form of a pulsating D.C. potential having approximately a square waveform and appearing virtually as a standing wave at the terminal 36. Differences in magnitude from one step level of potential to the next of the square waveform are directly proportional to the instantaneous difference between the means square values of the alternately applied input signal which produced that square waveform. These differences represent an error signal to the system which is caused to be nulled by feeding back output signal $E_o$ to the input of the converter 27.

The pulsating D.C. potential appearing at the terminal 36 may have a magnitude which is too small for feedback and readout purposes, and thus the system may require, in addition to the gain provided by the amplifier 33, an increase in the overall feedback loop gain. To obtain this overall feedback loop gain and filtering of the pulsating D.C. components appearing at the terminal 36, a buffer amplifier-integrator is employed to receive and integrate the potential derived from the terminal 36 over each half input-signal sampling period. Specifically, the terminal 36 is connected via a resistor 42 to an amplifier-integrator circuit comprising a D.C. amplifier 43 having a high negative voltage gain and an integrating capacitor 44, the latter being connected in the negative feedback circuit of the amplifier. The amplifier 43 also provides a low impedance output to the system.

It will be apparent that every half-period when the thermal converter input is connected to receive the signal $E_i$, the right plate of the capacitor 34 is grounded by a synchronizing pulse from the flip-flop 20. Conversely, every alternate half period when the output signal $E_o$ is applied to the thermal converter, the potential on the right plate of the capacitor assumes a potential equal to the difference between the potential of the thermal-converted output signal $E_i$ and that of a corresponding output signal $E_o$. Until a steady state condition is attained these potential differences appear as step potential increases or decreases in the waveform which is applied to the input of the amplifier-integrator.

The relative potential levels of the signals received from the terminal 36 determine the ramping direction of the ramp output voltage that is generated by the amplifier-integrator combination. Thus, the output potential of the amplifier 43 will ramp in a negative direction with positive-going input potentials and in a positive direction with negative-going input potentials. The output of the amplifier is clamped at ground potential by a diode 46 so that the output potential $E_o$ has only positive values. Until a steady state or null condition is attained in the feedback loop, the output potential of the amplifier 43 successively ramps toward or from ground potential during every other half sampling period when the thermal converter input is switched to receive the feedback signal $E_o$ and continues to ramp until the loop has attained a null condition. During alternate half-periods and again, until a steady state or a null condition is obtained, when the input of the amplifier 43 is grounded by forward condition of the diodes forming the bridge 35, the voltage stored on the integrating capacitor 44 will remain at its immediately previous potential level, with the result that the potential of the amplifier output plateaus from the final potential level of an immediately previous ramp. Upon obtaining a feedback loop null, the output of the amplifier-integrator combination will remain virtually constant except for the transient waveforms which are introduced by the initial connection of the thermal converter input to the signal $E_o$, as shown by FIGURE 3M, the level of this potential being equal to the R.M.S. value of the input signal $E_i$.

It may be recalled that the output potentials which appear at the output terminal 29 of the thermal converter 27 are typically pulsating D.C. signals having superimposed thereon a time-varying or A.C. transient potential. These transient potentials are introduced by the thermal converter into its output signal when the switch 23 makes initial contact with either input terminal 24 or 25 and is evidence of the fact that the thermal converter has been disturbed from an immediately prior state of thermal equilibrium.

FIGURE 2J illustrates a typical voltage waveform which appears at the thermal converter output terminal 29 after a null condition is attained in the feedback circuit as a result of the value of the D.C. output voltage $E_o$ being made equal to the R.M.S. value of the input signal $E_i$; it being realized that the R.M.S. value of a D.C. voltage is merely the magnitude of the voltage itself. In such case the transient waveform, designated $e_{th}$, is repetitive which, as related above, substantially lessens the problem of compenasting for such transients. FIGURE 2J' and FIGURE 3J' on a reduced time scale illustrate the situation wherein the input signal $E_i$ has an initial or nonsteady state R.M.S. value which is lower than that of the output signal $E_o$, an overall loop null condition having not yet been attained. The transient potentials could be expected to appear even though the input signals have identical R.M.S. values but the transient which is produced when both sampled input signals have or attain the same R.M.S. values assumes a waveform which repeats in a virtually consistent manner from one-half sampling period to another. Therefore, the possibility of providing proper compensation for these transients in the thermal converter output signal becomes realistically feasible and the need for attaining a rapid convergence of the thermal converter output to a null potential level representing the mean square value of each successively received input signal $E_i$ is manifestly essential.

Since the input terminal 23A of the thermal converter 27 is connected to receive the input signal $E_i$ from the input terminal 24 at an instant of time which coincides with a known value of the signal waveform (zero volts, for example), the potential which appears at the converter output terminal 29 will provide a true representation of the difference in magnitude between the input signals $E_i$ and $E_o$, assuming that the sampling frequency is low enough to allow the converter 27 to attain a state of thermal equilibrium during each half sampling period. To provide a rapid convergence of the potential at the terminal 25 to a magnitude which is proportional to the R.M.S. value of the input signal $E_i$, during every other half-sampling period when the connection is effected between the terminals 23A and 25, the system output signal $E_o$ is transmitted as a feedback signal via a feedback lead 45 to the terminal 25 and compared with the input signal $E_i$.

The system 10 is designed so that within an established range of input signal magnitudes a rapid convergence to a feedback loop null condition is attained. Preferably, the desired convergence between the signals $E_o$ and $E_i$, with $E_i$ having a substantially constant R.M.S. value for a number of continuous cycles is effected within a few complete sampling periods by proper choice of the overall time constant of the feedback loop. As will be apparent to those skilled in the art, within the defined range of input signals, the overall voltage gain of the feedback loop connecting the terminals 25 and 29 may be made such as to provide practically a direct magnitude equality between the R.M.S. values of the input signal $E_i$ and the feedback signal $E_o$ within the prescribed loop time constant.

To provide the proper polarity to the feedback loop signals, several factors should be taken into consideration. These factors include, for example, the type of element which is employed as a thermal converter 27, the voltage polarity of the demodulator bridge 35 and the phase relationship between the two square wave outputs produced by the flip-flop 20. With regard to the first of these factors, the voltage transfer characteristics of the device used as a thermal converter 27 determines the polarity relationship between the signal applied to input terminal 23A and the corresponding output signal received by the output terminal 29. For example, if the thermal converter is assumed to be a thermistor having a negative resistance and hence a negative voltage transfer characteristic, then the larger the R.M.S. value of the signal received at the terminal 23A, the more negative the potential received at the terminal 29 and vice versa. If, on the other hand, a thermocouple of conventional type is used, the converse will be the case since thermocouples normally exhibit positive voltage transfer characteristics.

The voltage polarity of the demodulator bridge 35 considered from the resistor 40 and 41 ends of the bridge circuit and the phase relationship of the synchronizing square wave produced at the flip-flop output terminal 1 which drives the input switch 24, determine the relative polarities of the thermal-converted signals which appear at the terminal 36. Thus, for the previously assumed nonsteady state condition of $E_i$ (R.M.S.) being greater than $E_o$ (R.M.S.), if it is desired that the polarity of the signal at the terminal 36 correspondingly represent these differences in $E_i$ and $E_o$, the alternate positive half cycles of the square wave output from flip-flop terminal 1, FIGURE 2G, may be utilized to establish the connection of the input signal $E_i$ to the thermal converter input terminal 23A coincidentally while the diodes of the bridge 35 are biased in a forward direction of current conduction by a positive half-cycle potential that is coincidentally applied to the upper end of the resistor 40. The initial transient $e_{th}$ and the rest of the waveform will be clipped to ground potential by the forward conduction of all diodes in the bridge 35 during the entire half period that the input signal $E_i$ is applied to the thermal converter 27. During the next half cycle of flip-flop 20 operation, the positive potential produced at flip-flop output terminal 0 is applied to the lower end of resistor 40 coincidentally with a negative potential which is received by the upper end of the resistor 40 from the flip-flop terminal 1. At that time, the potential $E_o$ at input terminal 25 is sampled by the thermal converter 27. All diodes of the bridge 35 are reverse-biased and the potential which appears at the terminal 36 during that corresponding half sampling period is proportional to the difference in magnitude between $E_i$ and $E_o$, as reflected by the step magnitude differentials in the square waveform.

The positive or negative-going step potential which appears at the terminal 36 is converted into a respective decrease or increase in the charge and hence the potential, on the feedback capacitor 44 of the integrating amplifier 43. If a thermistor is used as a thermal converter 27, since the amplifier 43 has a negative gain, the amplifier 33 should also have a negative gain in order to effect the desired nulling between $E_o$ and $E_i$ irrespective of their relative magnitudes. Under assumed conditions that $E_i$ (R.M.S.) is greater than $E_o$, FIGURE 3K depicts the polarity reversal which is performed by the amplifier 33 on an input signal having a corresponding waveform such as depicted by FIGURE 2J'. Since the capacitor 34 A.C. couples the amplifier 33 to the demodulator terminal 36, the waveform of FIGURE 3K will be symmetrical with respect to the zero-voltage axis. FIGURE 3L depicts the corresponding clipped output waveform produced by the aforementioned operation of the demodulator.

As long as the R.M.S. value of the input signal $E_i$ does not change drastically during a sampling period, through the aforedescribed operation of the system 10, the feedback error signal, represented by the waveform of FIGURE 3J', having an initial magnitude proportional to the difference in magnitude between such successive level of the square wave output at the terminal 29, is forced to converge to a null signal as depicted by FIGURE 2J. By nulling the feedback error signals the input-switching generated transients are forced to assume repetitive waveforms in the steady state output (and feedback) signal $E_o$, FIG. 3M. Consequently, it is possible to achieve satisfactory compensation therefor or filtering thereof from the output signal $E_o$ before that signal is supplied to a utilization device such as a voltmeter, for example.

While there has been described what is at present considered to be one embodiment of this invention, it will be obvious to those skilled in the art that various changes and modifications may be made in the instrument without departing from the invention, and it is, therefore, intended to cover all such changes and modifications as fall within the true spirit and scope of the invention.

What is claimed is:

1. A system for comparing the relative magnitudes of first and second input signals, the first input signal having a waveform which varies periodically as a function of time and crosses an axis once in a given direction during each period thereof comprising; means for detecting at least certain ones of a plurality of axis crossings of the first input signal, synchronizing means coupled to the detecting means for producing a first output signal in response to one detected axis crossing and a second output signal in response to a different one of the detected axis crossings, signal magnitude comparison means having an input and an output, and means responsively coupled to the synchronizing means for applying said first input signal to the input of said comparison means upon receiving said first output signal and for applying the second input signal to the input of said comparison means upon receiving said second output signal, said comparison means producing an output signal having a magnitude representative of the difference between the magnitudes of the first and second input signals.

2. In a system for comparing the relative magnitudes of two input signals, one of the input signals having a waveform which varies periodically with time and crosses an axis once in a given direction during each period thereof, the other signal being a D.C. feedback signal having a magnitude proportional to the R.M.S. value of the input signal waveform comprising; means for detecting at least certain of the axis crossings of the one input signal, synchronizing means coupled to the detecting signal for producing a first output signal in response to one detected axis crossing and a second output signal in response to a different one of the detected axis crossings, means for converting said one input signal into an equivalent, substantially D.C. signal, the converting means including an input and an output, switch means responsively coupled to the synchronizing means for applying said one input signal to the input of the converting means in response to said first output signal and the feedback signal to the input of said converting means in response to said second output signal, and feedback means responsive to said second output signal for synchronously coupling the output of said converting means to the input of said switch means whereby said D.C. feedback signal having a magnitude substantially proportional to the R.M.S. value of said one input signal is applied to the input of said converting means for comparison with said one input signal.

3. An R.M.S. to D.C. converter for electrical input signals having waveforms that vary periodically as a function of time and cross an axis of potential once in a given direction during each period thereof, the converter comprising; an axis-crossing detector for detecting the axis crossings of the input signals in said given direction and producing a detector output signal indicative of each axis crossing, synchronizing means including a source of synchronizing pulses coupled to said detector for producing a first output signal in synchronism with one of the detector output signals and a second output signal in synchronism with one of a plurality of successive detector output signals, a thermal conversion device including an input and an output for converting the mean square value of the electrical signal waveform into proportional output and feedback signals, switching means coupled to the synchronizing means and responsive to said first and second output signals for selectively switching the input of said thermal conversion device to respectively receive said input and said feedback signal, and feedback circuit means coupling the output of said thermal conversion device to said switching means and responsive to said second output signal for supplying said feedback signal to said switching means.

4. The converter as claimed in claim 3 wherein, said feedback circuit means includes a demodulator for demodulating the output of said thermal conversion device in response to said first and second output signals.

5. The converter as claimed in claim 3 wherein, said synchronizing means comprises an oscillator for producing first and second time-spaced enabling pulses, gating means coupled to said oscillator for receiving said enabling pulses therefrom and to said detector for receiving the detector output signals therefrom, said gating means being enabled to pass the first ones of different detector output signals which coincide with or follow the receipt by said gating means of said first and then said second enabling pulse, and a bistable device coupled to the output of said gating means and responsive to the first and second detector output pulses passed by said gating means for producing said first and second output signals.

6. The converter as claimed in claim 5 wherein, said feedback circuit means comprises a demodulator coupled to said bistable device and responsive to said first and second output signals for synchronously sampling the output of said thermal converter device.

References Cited

UNITED STATES PATENTS

| 2,805,394 | 9/1957 | Hermach | 324—106 |
| 2,857,569 | 10/1958 | Gilbert et al. | 324—106 |
| 3,213,364 | 10/1965 | Miller et al. | 324—106 |
| 3,219,929 | 11/1965 | King | 324—106 XR |
| 3,303,423 | 2/1967 | Staschover et al. | 324—106 |
| 2,951,976 | 9/1960 | Sasseen et al. | 321—1.5 |

JOHN F. COUCH, Primary Examiner
W. M. SHOOP, Jr., Assistant Examiner

U.S. Cl. X.R.
321—16; 324—106

Disclaimer and Dedication 3,470,445.—*Peter L. Richman*, Lexington, Mass. R.M.S. TO D.C. CONVERTER FOR PERIODIC SIGNALS. Patent dated Sept. 30, 1969. Disclaimer and dedication filed Mar. 17, 1971, by the assignee, *Weston Instruments, Inc.*

Hereby enters this disclaimer to the remaining term of said patent and dedicates said patent to the Public.

[*Official Gazette April 27, 1971.*]